(12) United States Patent
Villares Lenz César

(10) Patent No.: US 6,808,076 B2
(45) Date of Patent: Oct. 26, 2004

(54) SELF-CLEANING DRUM FILTER

(76) Inventor: Daniel Villares Lenz César, Rue I, n.o. 50 - Condominto Quinta da Boa Vista "A", City of Ribeirão Preto, State of Sao Paulo (BR)

( * ) Notice: Subject to any disclaimer, the term of this patent is extended or adjusted under 35 U.S.C. 154(b) by 0 days.

(21) Appl. No.: 10/468,117

(22) PCT Filed: Jan. 14, 2002

(86) PCT No.: PCT/BR02/00007
§ 371 (c)(1),
(2), (4) Date: Feb. 9, 2004

(87) PCT Pub. No.: WO02/055175
PCT Pub. Date: Jul. 18, 2002

(65) Prior Publication Data
US 2004/0112825 A1 Jun. 17, 2004

(30) Foreign Application Priority Data
Jan. 12, 2001 (BR) ............................................. 0100425
Jan. 14, 2001 (BR) ............................................. 0100425

(51) Int. Cl.[7] ........................ B01D 29/64; B01D 29/66; B01D 33/06
(52) U.S. Cl. ....................... 210/391; 210/393; 210/396; 210/402
(58) Field of Search ............................... 210/359, 391, 210/393, 396, 402, 407, 408, 413

(56) References Cited

U.S. PATENT DOCUMENTS 3,617,556 A * 11/1971 Cole et al. .................. 210/671
4,154,588 A    5/1979  Herndon, Jr.
5,558,042 A    9/1996  Bradley et al.
6,123,841 A *  9/2000  Gotoh ......................... 210/169
6,579,458 B2 * 6/2003  Mickelat et al. .......... 210/360.1
6,616,840 B1 * 9/2003  Boele .......................... 210/297

FOREIGN PATENT DOCUMENTS

CA    2257332       6/2000
GB    2 302 818 A   2/1997

* cited by examiner

Primary Examiner—Fred G. Prince
(74) Attorney, Agent, or Firm—Burns, Doane, Swecker & Mathis, L.L.P.

(57) ABSTRACT

Self-cleaning drum filter comprising a pressure vessel (11) containing a cylindrical filtering drum (15) to whose outside curved surface a filtering mat (57) is juxtaposed, provided with means for removal of the cake collected on the outside of said filtering mat consisting of a scanner plate (18), substantially equal in length to the filtering drum cylindrical surface, juxtaposed to the inside wall of said pressure vessel, said plate being provided along its length with a through-slit (22) centrally placed that provides a passage between the inner (69) and outer (68) faces of said scanner plate, said outer face (68) being provided, along the length of said slit (22), with a trough (21) which forms, together with the inner wall of said pressure vessel, a channel for collecting the flushing liquid during the cake-removal cleaning operation. Said channel communicates with an exit conduit (24) outside said pressure vessel by means of a plurality of through-holes (23) in the wall (19) of said pressure vessel, for disposal of the flushing liquid.

10 Claims, 9 Drawing Sheets (PREVIOUS TECHNIQUE)

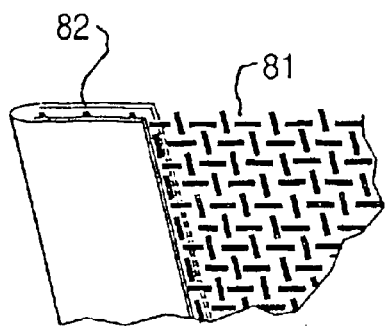
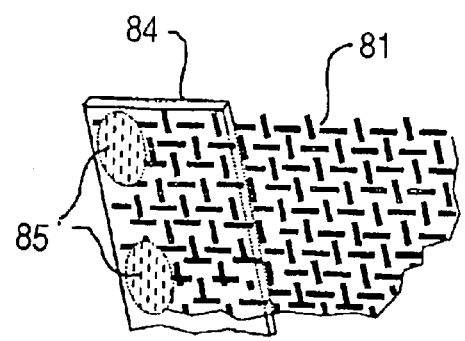
Fig.9a
Fig.9b
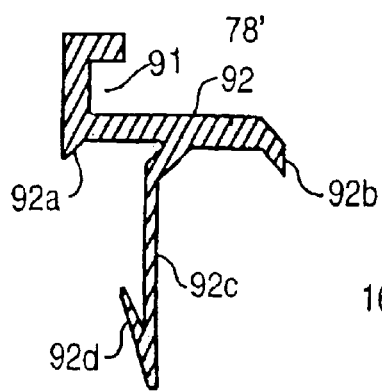
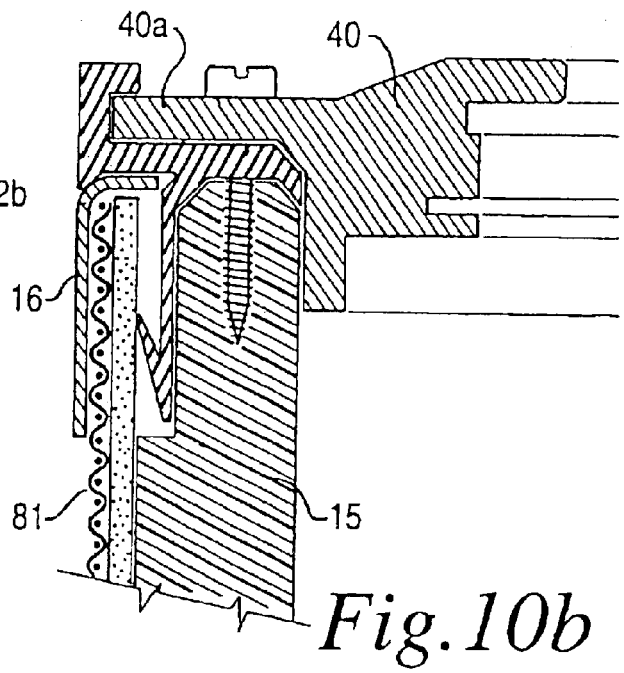
Fig.10a
Fig.10b

SELF-CLEANING DRUM FILTER

FIELD OF THE INVENTION

The present invention relates to a liquids filtration equipment and, more specifically, to a drum filter employing a woven mat as the filtering medium.

BACKGROUND OF THE INVENTION

Devices for removing particulate materials suspended in liquids are already known and widely employed, said devices comprising a rigid cylindrical drum having a perforated circumferential wall extending between two substantially closed end portions, said perforated wall being entirely covered by the filtering mat. Said drum is immersed in the liquid to be filtered, and a pressure differential is established, with the pressure inside the drum being lower than on the outside. The liquid with the suspended solids flows through said filtering mat, said solids being collected at its outer surface, while the clean filtered liquid inside the drum is removed and conveyed to the intended utilization. The size of the particulate material being removed depends on the mesh of the filtering mat, being determined by the conditions of the liquid as well as by the application, such as water treatment for domestic and industrial use, papermaking, steel mills, irrigation, etc., said mesh usually ranging between 2 millimeters and 1 micrometer. The pressure differential between the drum's outside and inside is a function of the flow rate, the mesh size and the amount of cake that is collected on the outside surface of the filtering mat; ranging usually between 0.05 and 2 bar.

Actually, as the amount of solids retained by the filtering mat increases, the flow of liquid passing through will decrease and a greater pressure difference will be needed to effect the flow of liquid. The removal of this material—usually called "cake"—is one of the main problems in the design of such filters. In some of the known systems, the normal filtering operation is periodically shut down and scraping elements are activated in order to detach the cake from the outside surface of said filtering mat. This is undesirable, as such down time may not be tolerated in some industrial applications that require a continuous flow of filtered liquid.

Another known system, described in U.S. Pat. No. 5,558,042, comprises a cylindrical drum with a perforated circumferential wall over which is placed a flexible and porous flexible layer which supports a resilient filter screen. The cleaning apparatus for removing the cake collected on the outside of said screen is shown in FIG. 1, in which R indicates the drum's direction of rotation. This cleaning device employs a rigid plate 98 having its face 98a in sliding contact with the resilient filter screen 96. This plate is provided with a narrow slot 100 equal in length to the cylinder generatrix, connected to a vacuum device through a conduit 104, which has a flexible portion to allow the application of a spring's force to hold the wear surface 98 in continuous contact with the outer surface of the filter screen. The apparatus comprises associated cleaning means provided by one or more nozzles 124 connected via a water conduit 126 to a pressurised water supply, said nozzles generating a fan-shaped spray of water to dislodge the particulate material remaining on the mesh filter, said particulate material being added to the unfiltered water. This device has several drawbacks, such as the wearing down of plate 98, due to the fact that the cake removal depends on the vacuum head that can only be maintained by pressing said plate against the mesh filter surface. This abrasion of said plate requires its periodical substitution, with the attendant shutdown of the filtering operation. Additional disadvantages of said apparatus comprise the fact that it requires a high pressure pump for the water spray, as well as a vacuum pump for the cake removal through conduit 104. Moreover, the sediment-carrying water from the water spray action is added to the unfiltered water, so the sediment is retained again by the mesh filter.

SUMMARY OF THE INVENTION

Accordingly, it is an object of the present invention to provide a rotary drum filter capable of continuous operation that dispenses with the need to press the edges of the suction slot against the surface of the filtering mat.

It is another object of the invention to provide a system in which the removal of the cake from the filtering mat takes advantage of the pressure of the force pump that propels the liquid, thus obviating the need of additional pumps for suction or removal of said cake.

It is a further object of the invention to provide a filtering device in which the filtering mat rests directly upon the outside wall of the rigid cylindrical drum frame, doing away with the need for an intermediate porous flexible support layer.

According to a first aspect of the present invention, there is provided a filtering system consisting of a pressure vessel containing the cylindrical drum frame to which the filtering mat is attached, and a mat cleaning device comprising a scanner plate composed of a rigid plate parallel to the drum axis fixedly attached to the inside wall of said vessel, having a first surface facing said drum and a second surface facing said inside wall of said vessel, the opening that allows the flow of the flushing liquid between said surfaces being provided by a slit substantially equal in length to the cylinder generatrix, said slit forming a channel between the substantially flat first surface and a second surface, the latter being conformed in a way that forms a trough substantially as long as said slit, said trough communicating with an outlet for draining the flushing liquid that passes through said slit.

According to a further feature of the invention, the pressure in said trough is lower than the pressure of the filtered liquid collected inside the drum, which is lower than the pressure head between the containing vessel wall and the outside of the filtering drum assembly.

According to yet another feature of the invention, the cake is removed by the concurrent effect of two liquid streams, the first one flowing straight through the filtering mat, from the inside to the outside of the filtering drum, and the second tangential to said mat consisting of two converging streams that flow from the edges of the scanner toward said slit, the total flushing liquid flux through said slit being the sum of said first and second currents.

According to a further feature of the invention, the cake is loosened by the action of one or two brushes extending alongside the edges of the scanner plate having the bristles substantially perpendicular to the scanner's first surface, said bristles having their length dimensioned so as to slidingly touch the filtering mat surface.

According to a further feature of the invention, the cylindrical drum frame wall is provided with a plurality of through-holes to allow the flow of the filtered liquid, the outside of said wall consisting of a multitude of grooves parallel to the cylinder generatrix, said filtering mat resting upon the ridges separating said grooves, the latter conveying the liquid uniformly over the drum surface in the regions between said through-holes, resulting in a greater filtering area comprising substantially the whole surface of the filtering mat.

According to a further feature of the invention, the drum supporting and rotating means allow for lateral oscillations, thus accommodating any eventual drum eccentricity.

BRIEF DESCRIPTION OF THE DRAWINGS

The features and advantages of the present invention will become better understood from the following description of a preferred embodiment by way of non-limiting example only, taken in conjunction with the accompanying drawings, wherein:

FIG. 9 shows two embodiments of the metal shims attached to the protective screen edges.

FIG. 10 shows an alternative embodiment of the gasket placed between the cylindrical portion and the end disks of the filtering drum.

DETAILED DESCRIPTION OF THE PREFERRED EMBODIMENT

Figure 1:
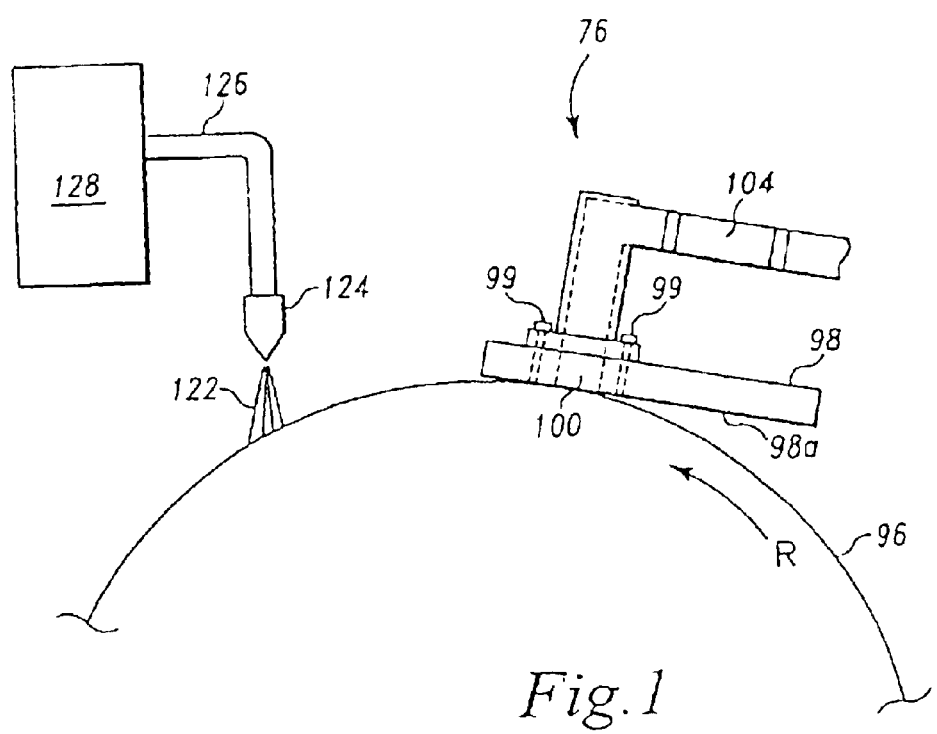
FIG. 1 reproduces FIG. 6 of the known technique as described in U.S. Pat. No. 5,558,042.
Figure 2:
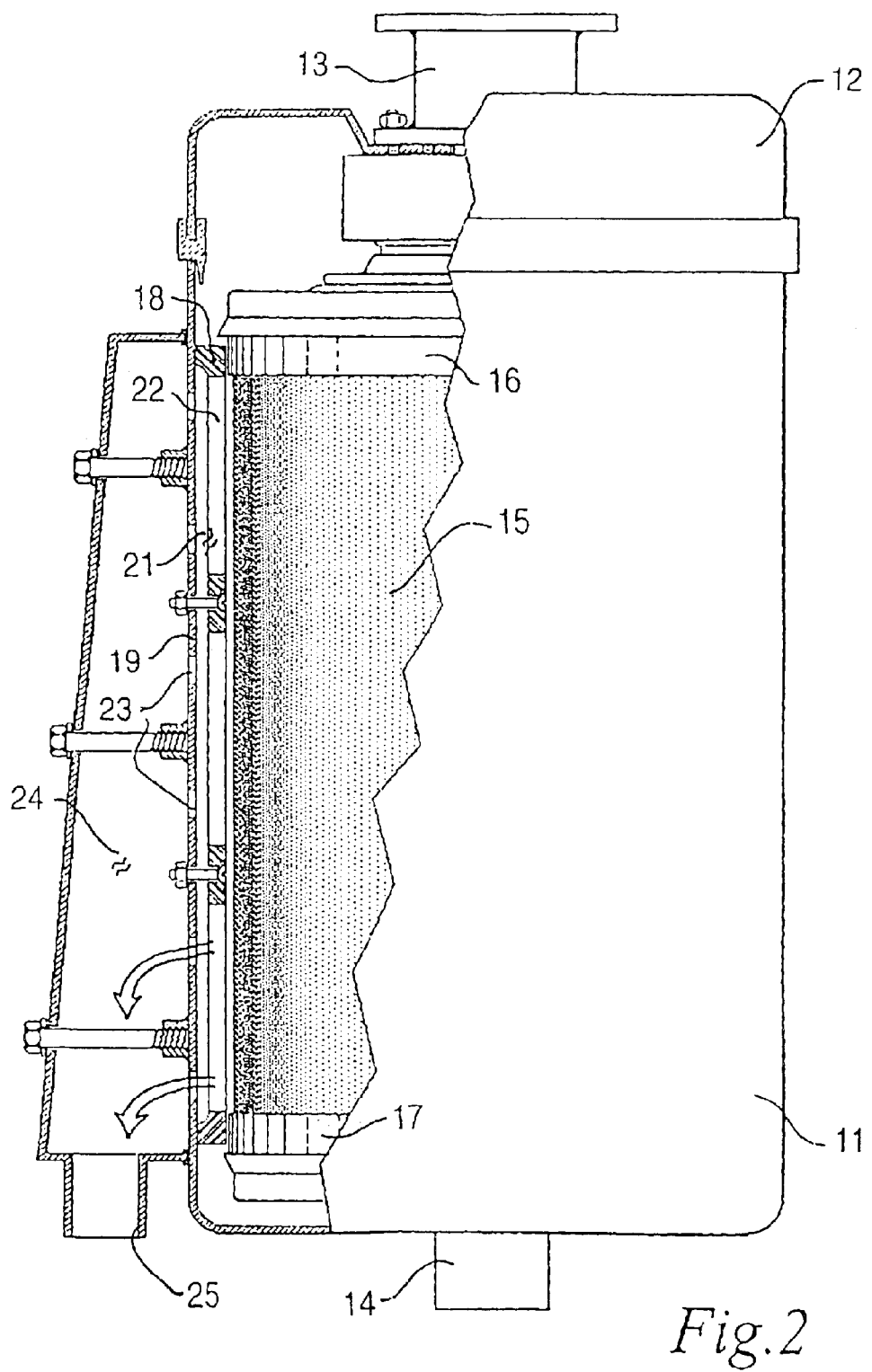
FIG. 2 shows the self-cleaning filter according to the invention.

Referring to FIG. 2 of the drawings, the proposed system comprises a substantially cylindrical container 11 provided with a removable lid capped by a short flanged length of pipe 13 which supports the motor and the speed reducer gearing of known type (not shown in, the drawings) which rotate the drum during the cleaning operation, the bottom of said container being provided with an outlet pipe 14 which is connected to the inside cavity of the filtering drum 15. Encircling the upper and lower edges of said drum's circumferential portion there are provided two smooth bands 16, 17 whose polished outer surfaces slidingly contact the end portions of the scanner plate 18, the latter being shown in transverse section. Said bands, fashioned of inert and wear-resistant material such as stainless steel, define the clearing between the scanner plate first surface and the filtering mat, typically of the order of 1 millimeter. The second surface of said scanner plate 18 is juxtaposed to the container's wall 19 inner face, so that the trough that runs along said scanner's second surface forms with said container's wall inner face, a channel 21 where the flushing liquid that comes through slit 22 during the cleaning operation is collected, as will be described in connection with FIGS. 5 and 6. The container wall is provided with a plurality of through holes 23 aligned with said channel, allowing the flow of the liquid out to the collecting chamber 24, that discharges the flushing liquid through the drain tube 25. This arrangement avoids mixing the flushing liquid, carrying the cake residue in suspension, with the liquid to be filtered, as happens in other proposed systems such as the one shown in FIG. 1.

Figure 3:
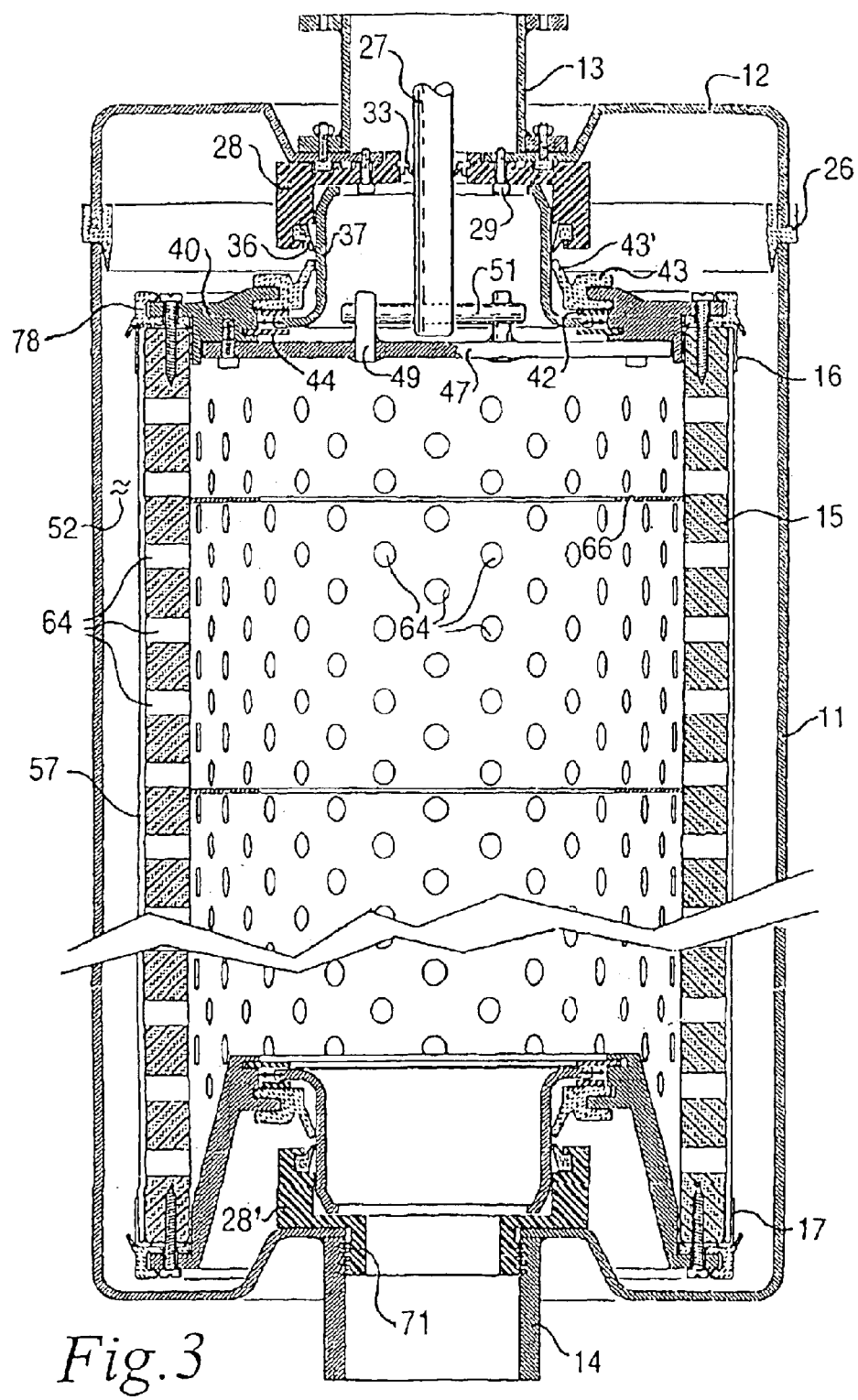
FIG. 3 shows the longitudinal section of the filtering drum and associated drive and sealing means.
Figure 4:
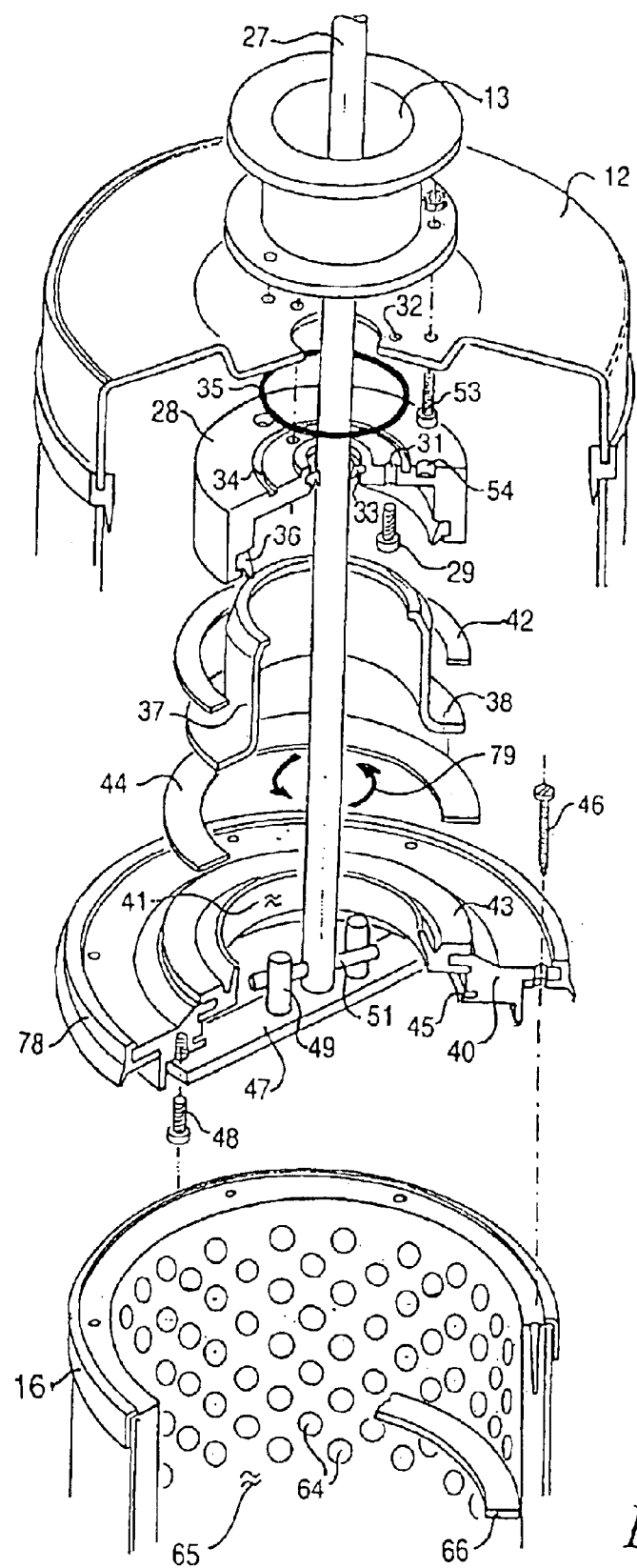
FIG. 4 shows an exploded view of the elements that form the upper part of the filter.

FIGS. 3 and 4 show in detail the filtering drum and its sealing means, the linkage that transmits the rotation to said drum, as well as the watertight bushings that allow the lateral movement of said drum during rotation. As shown in the drawings, the drum is mounted concentrically with the cylindrical container 11, which is closed by a removable lid 12. The drawing depicts the sealing ring 26 between said lid and said container body; the bolts that secure said lid are not shown in this figure. Fastened to the top of this lid is a short flanged length of pipe 13 to which the speed reducer and the motor are attached, these latter elements not being shown as they are well known in the art. Said speed reducer imparts a rotational force to the axle 27 which drives the drum.

As shown in FIG. 4, the lid 12 is provided with threaded holes 32 for receiving the threaded end portions of bolts 29 which pass through holes 31 provided in a cup 28, made of nylon or UHMW plastic, the tightening of said bolts pressing the upper face of said cup against the inner face of said lid.

The following sealing elements are associated with said cup:

A sealing ring 33 whose resilient lip slidingly contacts shaft 27, preventing the leakage of the pressurised liquid into the tube 13;

The upper face of cup 28 is provided with a circular groove 34 into which a pliable seal in the form of an O-ring 35 is fitted. As bolts 29 are tightened, pressure is applied to said O-ring causing a deformation to form a sealing relationship between the top of said cup 28 and the inner face of lid 12;

A sealing ring 36 inserted in a groove 39 which runs along the lower border of the internal wall of said cup, said ring being provided with a resilient lip that slidingly contacts the outer polished surface of a cup 37 made of stainless steel, or any equivalent inert material.

According to the invention, said cup 37 accomodates any side (radial) oscillation of the filtering drum during the cleaning operation, said oscillation being caused by said drum's eccentricity. The upper portion of said stainless steel cup 37 fits slidingly into cup 28, while its lower portion forms a skirt 38 that allows said lateral movement of the drum, as explained below.

As shown in FIGS. 3 and 4, the lower portion of said cup 37 is inserted into the center opening 41 of an aluminium disk 40 that forms the end portion of the filtering drum. A first and a second flat plastic rings 42, 44—made of nylon, teflon or similar inert material—are respectively juxtaposed to the upper and lower surfaces of said skirt 38. Encircling internally the lower portion of opening 41 is provided a narrow grove 45 into which is fitted the second ring 44, said ring pressing upward the skirt 38 as well as said first ring 32, suppressing any vertical play of said skirt while allowing it to slide in a radial direction between said first and second rings, as indicated by the double arrows in FIG. 3. The figures also show a resilient lip 43' provided in the rubber gasket 43, which slidingly fits over the polished face of cup 37, thus blocking any leakage of the unfiltered liquid.

According to the invention, the rotation of the filtering drum during the cleaning operation is mediated by said aluminium disk 40, that fits tightly over the upper edge of the drum's circumferential portion 15, the attachment between said parts being provided by a plurality of screws 46, as shown in FIGS. 3 and 4. The external lip of said disk is hemmed in by a round gasket 78 made of rubber, neoprene or similar material, sealing the interstice between said drum's upper edge and said disk. As shown by FIGS. 3 and 4, a bar 47 is attached by bolts 48 to the underside of said disk substantially along its diameter. Two vertical posts 49 are attached—preferably by soldering—to the upper surface of said bar, symmetrically positioned in relation to its middle. The lower extremity of axle 27 is provided with a cross-bar 51 whose ends press slidingly against the sides of said posts. The force couple 79 is transferred to the disk 40 by axle 27 through transmission means comprising said crossbar 51, posts 49 and flat bar 47, thus causing the rotation of the filtering drum. An advantageous feature of said transmission arrangement is the fact that it allows both horizontal and vertical play between said axle and said filtering drum, the coupling effect being restricted only to the force couple 79 that imparts the rotational movement to the filtering drum. Said play also occurs in the sealing device comprising the stainless steel cup's skirt (38), the disk-like rings 42, 44 and the aluminium disk 40, as shown by the arrows in FIG. 3. Therefore, said disk, that is affixed to drum 15, is free to oscillate radially to keep pace with the latter's eccentricity, without impairing either the rotational movement or the sealing of the device, the first being provided by the sliding contact between the cross-bar 51 and pins 49, while the sealing is accomplished by the sliding insertion of skirt 38 between the disk-like rings 42, 44.

It should be pointed out that the liquid is subjected to the highest head in the annular space between the container wall and the outside surface of the filtering drum. Said pressure pushes the resilient lip 43' against the outer surface of the stainless steel cup 37 and, in a similar manner, the lip of gasket 36 against the same surface.

The contact between said resilient lip 43'and' said cup surface, as well as between skirt 38 and disk-like rings 42, 44, produces a rotational drag force that is transmitted to cup 28 through the friction between said cup 37 and gasket 36. Rotation of said cup 28 is prevented by attachment screws 29 and additionally, by the restraining effect provided by the fitting of the heads of the Allen-type screws 53 in the round cavities 54 provided in the upper surface of cup 28.

Figure 5:
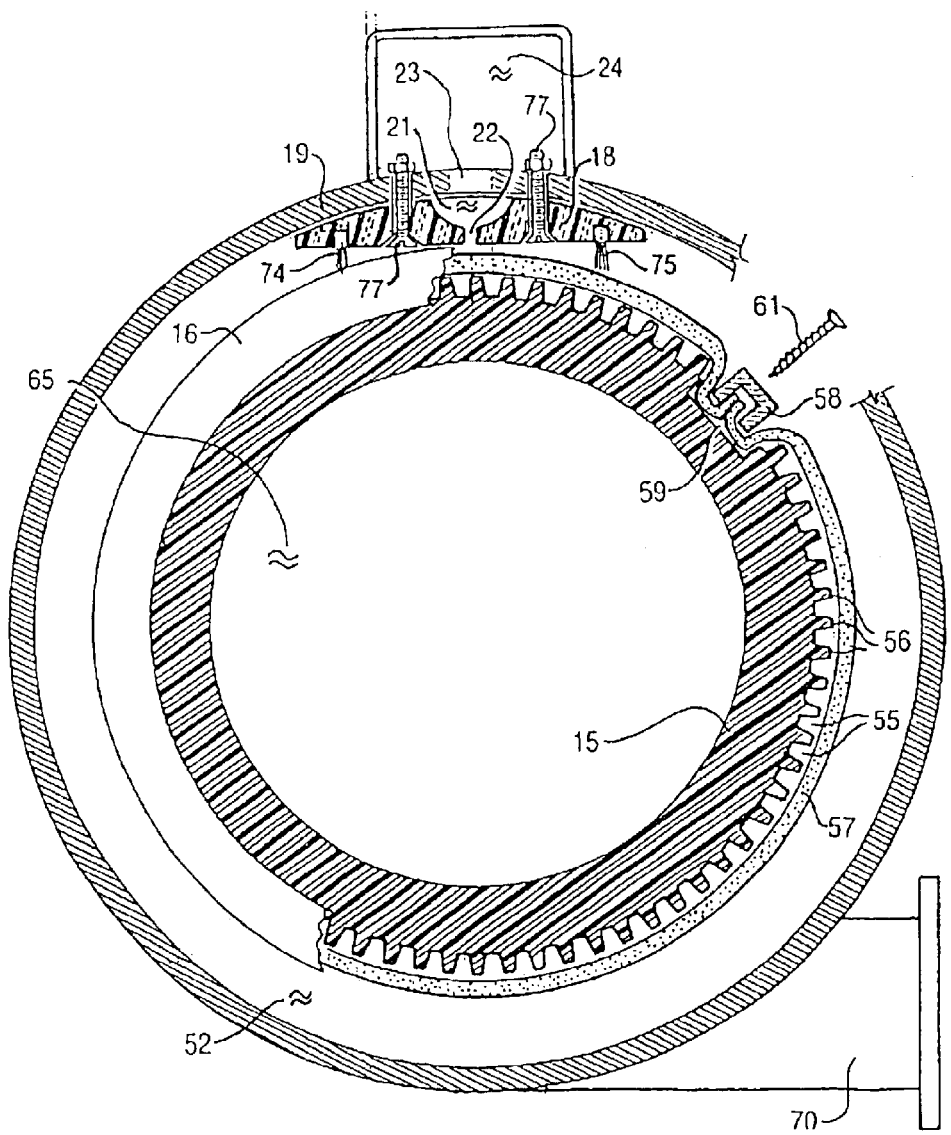
FIG. 5 shows a transverse section of the filter as well as the elements that provide the removal of the cake from the filtering mat surface, according to the invention.

The filtering drum comprises the cylindrical pipe 15, which is of the kind commercially known as "geomechanical tubing". This pipe is made of inert plastic material, and possesses great strength due to the thickness of its walls. As shown in FIG. 5, the outer surface of this pipe consists of a multitude of grooves 55, parallel to its axis. The ridges 56 between adjacent grooves provide support to the filtering mat, which forms a sleeve that encases completely the circumferential wall of the cylinder. Said sleeve is slidingly fitted on the outside of said tube, being anchored by the compression of shim 58 wedged in channel 59 by the tightening of screws 61.

As shown in FIG. 5, said shim consists of a metal length with a U section, the trough of which accommodates the seam of said sleeve. When said shim is pressed into channel 59, it draws with it the portion of the sleeve comprising said seam resulting in the tangential tensioning of the filtering mat 54, which therefore is compressed against the filtering drum surface. This compression, added to the anchoring effect produced by pressing the edges of the U-shaped shim 55 against the bottom of channel 59, prevents any lengthwise or tangential displacement of said filtering mat. Moreover, the channel 59 is dimensioned so that the external face of shim 55 is substantially aligned with said filtering mat's outside surface, providing a continuous cylindrical surface without bumps.

FIG. 5 shows, in addition, that pipe 70 feeds the stream of liquid to be filtered into the filter container in a tangential direction relative to the filtering drum. The pressure of this stream assists in the rotation of said filtering drum during the cleaning operation, thus lessening the power consumption in the drive motor.

As depicted in FIGS. 3 and 4, the geomechanical pipe 15 is provided with a plurality of through-holes 64 that allow the flow of the filtered liquid into the inner region 65 of the filtering drum. This liquid is carried off by exit pipe 14 connected to the lower end said filtering drum. The above mentioned drawings show, additionally, the reinforcing rings 66 that are tightly fitted inside said filtering drum 15, providing greater resistance against the crushing force exerted by the liquid's pressure outside said filtering drum.

In the course of the normal filter operation, the filtered particulate material accumulates as a layer on the outside of the filtering mat 57, gradually obstructing its voids and reducing the flow of filtered liquid. Therefore, it becomes necessary to periodically remove said layer, usually called "cake", to restore the porosity of said filtering mat. The means for removal of said cake are shown in FIGS. 2, 5 and 6 and comprise the scanner plate 18 and the draining duct 24 and associated elements, as will be detailed in the following paragraphs.

Figure 6:
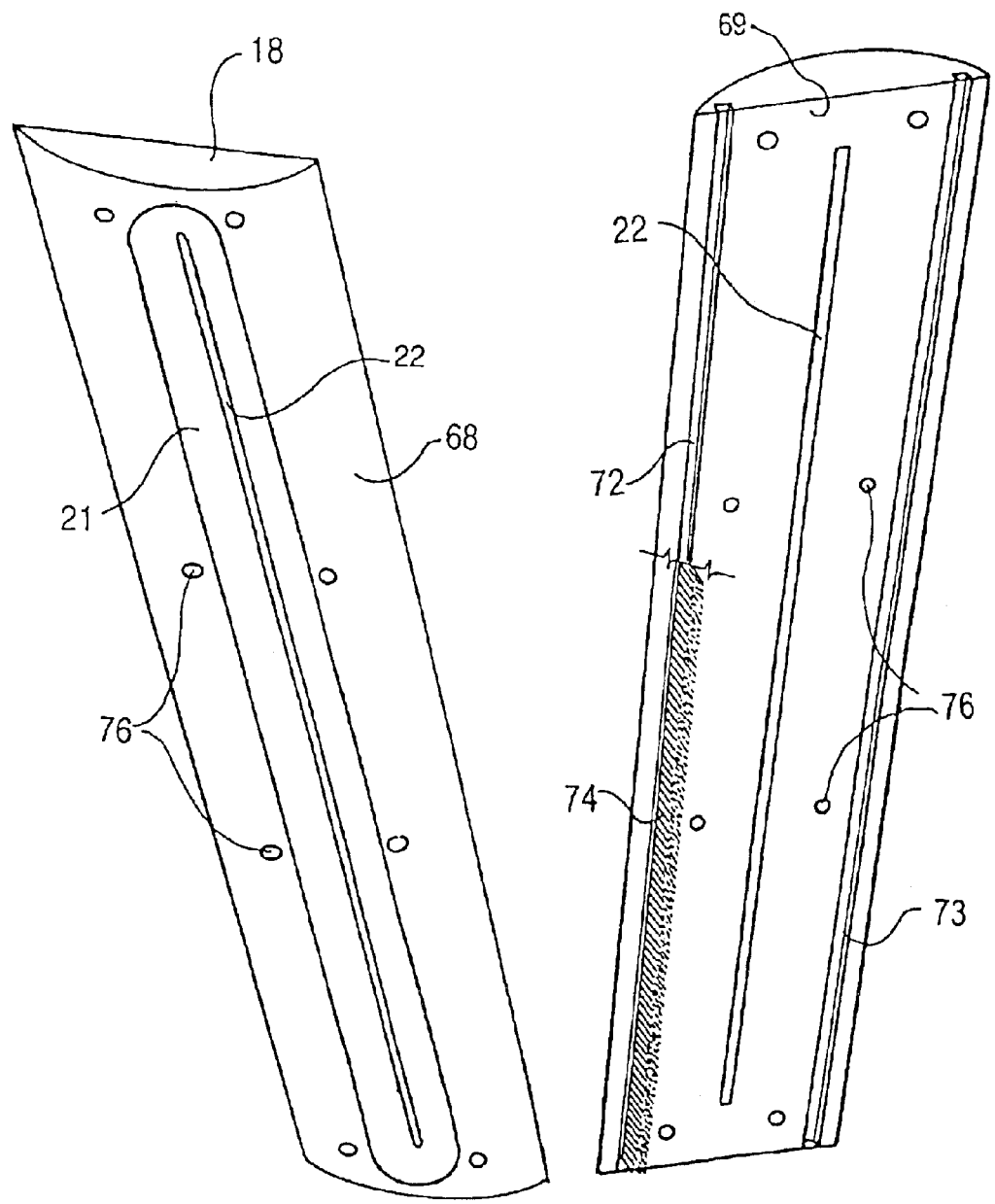
FIG. 6 shows the scanner plate, according to the invention.

According to the invention and as shown in FIGS. 2, 5 and 6, the scanner plate 18 comprises an elongated plate with a half-round transversal section, having its length equal to the filtering drum's height. This plate is made of inert material, resistant to chemical action of substances contained in the filtered liquid; in case of water, UHMW poliethylene or nylon can be used. The outer surface 68 of this scanner plate is curved, with a radius substantially equal to the inner radius of the filter container 11, so as to allow the fitting by juxtaposition of said outer surface to the container's inside wall. Along the length of said outer face of said scanner plate, a trough 21 is provided, forming, together with the container wall to which said scanner plate is attached, a channel that collects the flushing liquid during the cleaning operation, said flushing liquid being drained off by means of holes 23 in the container wall 19 and exit conduit 24. The inner face 69 of said scanner plate is substantially flat, being provided along its length with a slit 22 that allows the flushing liquid to flow from said internal face to the trough 21 in the external face. Running along both sides of said slit are provided two slots 72, 73 into which fit the shanks of brushes 74, 75, said brushes reinforcing the cake removal action.

As shown in FIGS. 2 and 5, the distance between the inner face 69 of scanner plate and the surface of the filtering mat is in the order of 1 millimetre. This clearance is maintained substantially constant by the metallic bands 16, 17 placed around the upper and lower ends of said filtering drum, which slidingly contact said scanner plate extremities. Said bands are polished to minimize friction with said scanner, and can be fashioned of stainless steel.

Removal of the cake collected on the filtering mat outside surface is provided by the stream of flushing liquid channeled through slit 22. Said stream is formed by the following components: the first is the backflow that passes from the inside to the outside of the perforated wall of the filtering drum 15, said backflow being caused by the pressure differential between the inside 65 of said filtering drum and the pressure in channel 24 which, in most cases, is the atmospherical pressure. The second is the sum of converging streams that flow between the side edges of face 69 of the scanner plate and the filtering mat surface, said streams being directed toward said slit 22. Due to the gradual narrowing of the channel between said filtering mat and the center of the scanner plate, the velocity of the liquid in said streams is strongly accelerated in the vicinity of said slit, removing the cake and drawing the particulate material out of the filtering system through slit 22, duct 21 and collecting channel 24.

Brushes 74, 75 collaborate in said cake removal, the extremities of the bristles sweeping the filtering mat surface and loosening the cake. According to the nature of the particulate material that is to be removed, the system can operate either without said brushes, with one brush only or with both brushes. The system is characterised by a high efficiency, the flushing liquid used for cake removal being only 2% of the total filtered flow of liquid.

FIG. 6 additionally shows a plurality of through-holes 76 placed in two parallel rows along the edges of trough 21. As shown in FIG. 5, said holes provide the attachment of said scanner plate to wall 19 of the container by means of bolts 77.

It should be remarked that the system operates under pressure, being in line with the pumping circuit. Therefore, it employs the head generated by the pressure pump, obviating the need for additional pumping means, such as described in U.S. Pat. No. 5,558,042.

Figure 7:
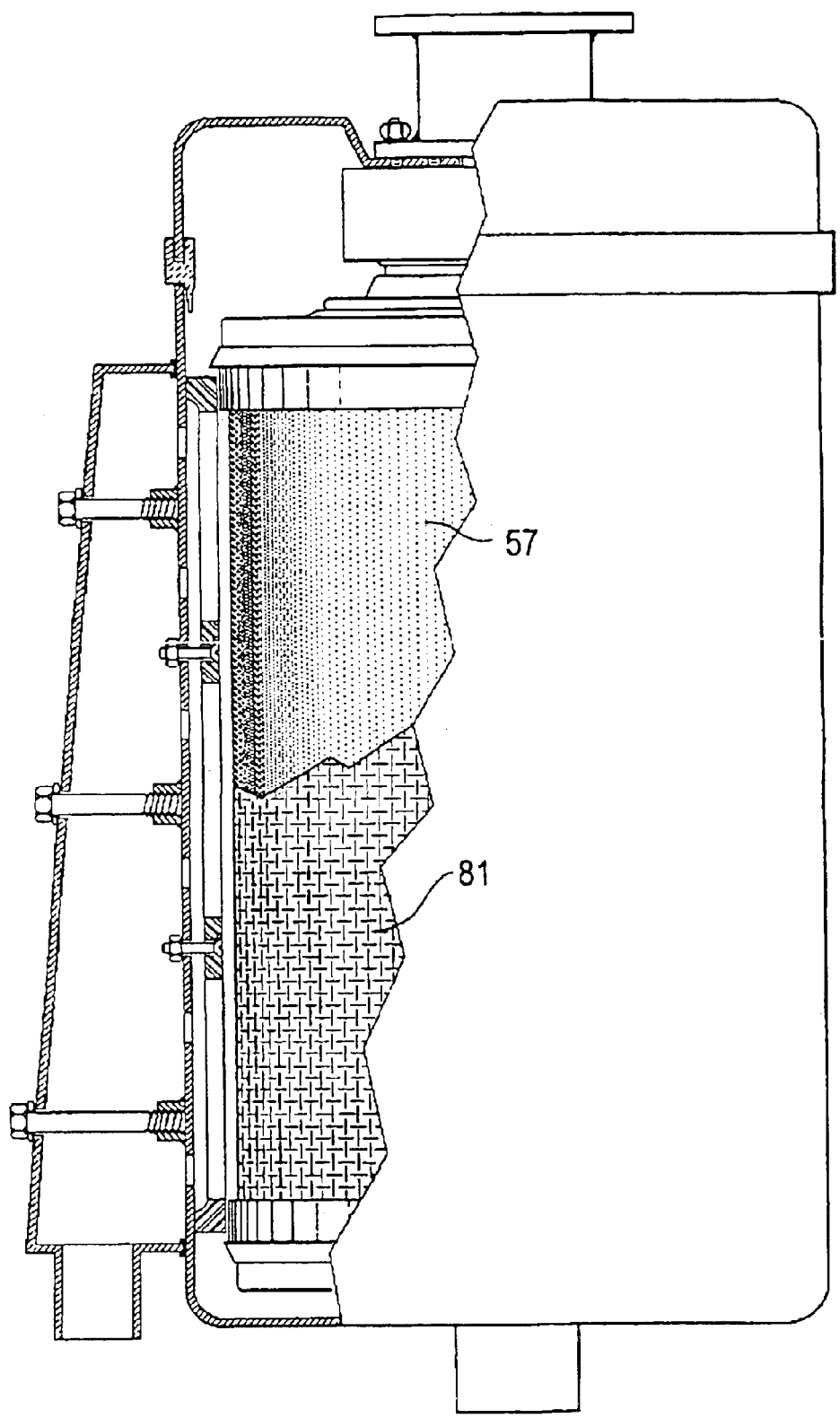
FIG. 7 shows an alternative embodiment of the filtering drum in which the filtering mat is covered by a protective screen.

Notwithstanding the fact that the invention has been described based on an exemplary embodiment, changes can be made without overstepping the bounds of the invention. One such change is shown in FIGS. 7 and 8, and consists of the juxtaposition of a protecting screen over the filtering mat.

Such alternative embodiment of the invention may be advantageously employed with close-woven filtering mats. In such cases, the outward force exerted by the flushing liquid overcomes the radial tensioning force provided by the cooperating effect of anchoring elements 58 and 59. Consequently, the filtering mat is stretched and drawn toward the scanner plate and rubs against the inner face 69 of said scanner plate in the vicinity of slot 22. Said stretching affects adversely the performance of the filtering mat, besides hindering the drum's rotation due to the drag caused by the aforementioned rubbing.

Figure 8:
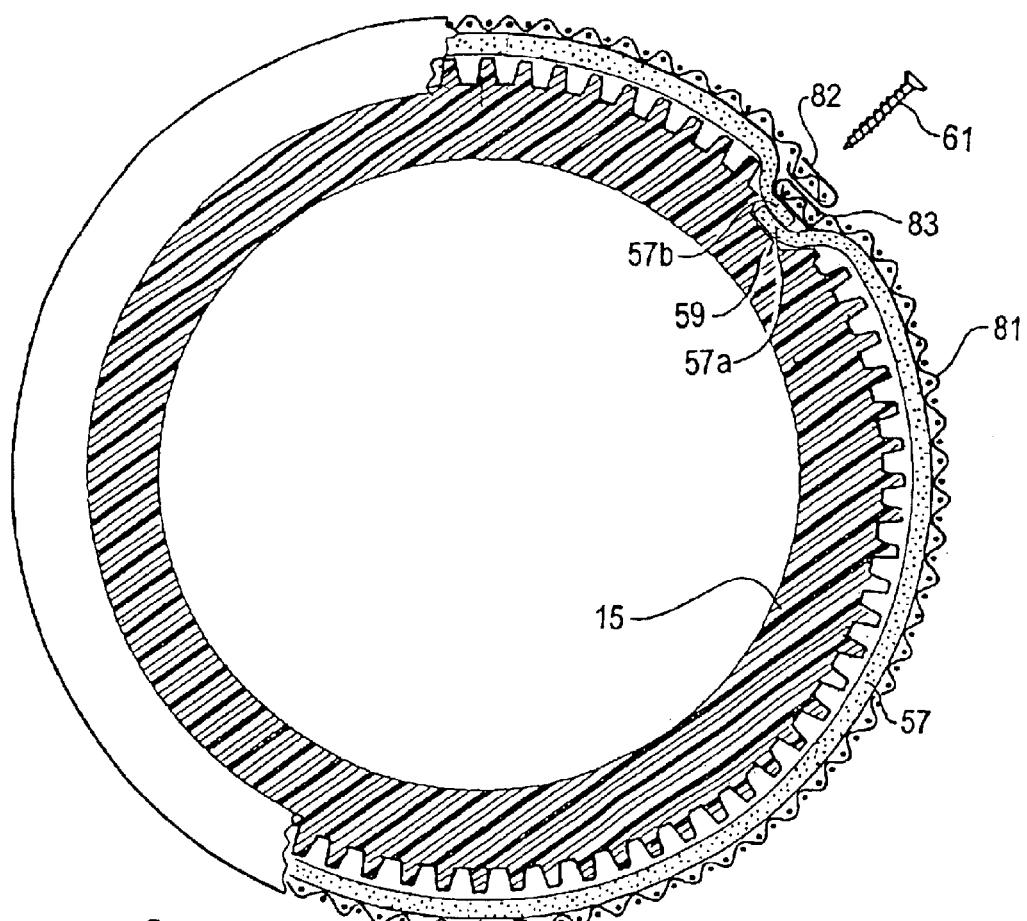
FIG. 8 shows, by means of a transverse section, the protective screen placed over the filtering mat as well as the means used for anchoring said protective screen.

The protective screen 81 is fashioned out of a chemically inert and mechanically strong material, such as stainless steel, and forms a sleeve that completely encases the filtering mat, as can be seen in FIG. 8. Said screen is radially tightened together with the filtering mat 57, whose edges 57a and 57b are lap-joined and sewn together (the sewing not being shown in the drawings). As depicted in this figure, as well as detailed in FIG. 9a, the free edges of the protective screen 81 are crimped by deep channel-shaped shims 82, 83. Said shims are superposed to said lap-joint and the whole is pressed into the trough 59 on the outside wall of the cylindrical pipe 15, by screws 61. The aforesaid elements are dimensioned so as to form a substantially uniform surface with no bumps or depressions when assembled.

An alternative way of attaching the edges of screen 81 to the shims is shown in FIG. 9b. In this embodiment, the shim is a flat length of metallic strip 84, preferably of the same material as the screen, the attachment being made by solder spots 85. In both ways of attachment shown in FIGS. 9a and 9b, the through-holes that allow the passage of screws 61 is omitted for clearness sake.

An alternative embodiment of gasket 78 is shown FIGS. 10a and 10b. The first of these drawings depict a transversal section of gasket said alternative embodiment, 78', while FIG. 10b show the position of said gasket in the filtering drum assembly. As shown, said gasket section is shaped substantially in the form of a "T", comprising the following elements:

A channel 91 that overlies the external edge of the horizontal (upper) bar of the T, having its hollow part facing inwards so as to lodge the outer edge 40a of the aluminium disk 40 which closes the end of the cylindrical filtering drum, The horizontal bar of the T, forming a narrow disk 92, provided with a first downward triangular slanting lip 92a along its outer edge, which is pressed against the stainless steel ring 16 by the pressure of the liquid on the outside of the filtering drum. The inside edge of said bar is provided with a second lip 92b, wedged between the top edge of the geomechanical tube 15 and said disk 40.

A substantially vertical flap 92c roughly positioned at the center bar of the T section, said flap being juxtaposed against the surface of a circular depression at the geomechanical tube ends provided by turning or milling. The distal edge of said flap is provided with a lip. 92d which is pressed against the inner surface of the filtering mat, thus avoiding any leakage around the ends of the edge of said filtering mat.

The sealing of the lower end of the filtering drum employs the same technique and the same elements as described, like, for instance, the use of gasket 78'.

The cleaning operation need not be continuous, being switched on only when the cake removal is required. This switching can be provided either by a timer or by a pressure sensitive device.

Other changes and modifications in form and detail may be made by workers skilled in the art without departing from the spirit of the invention, whose scope, therefore, is defined in the following claims.

What is claimed is:

1. SELF-CLEANING DRUM FILTER comprising a pressure vessel (11) into which liquid to be filtered is pumped, containing a cylindrical filtering drum (15) to whose outside curved surface a filtering mat (57) is juxtaposed, the liquid passing through said filtering mat from the outside to the inside (65) of said drum, said filter being provided with means for removal of cake collected on the outside of said filtering mat, rotation of said drum during the cake-removal operation being provided by linkage means between a motor-driven speed reducer and said filtering drum, the filter being provided with sealing means between the outside and the inside of said filtering drum, characterized by the fact that said means for removal of the cake comprise a scanner plate (18) whose outer face is juxtaposed to the inside wall of said pressure vessel, the inner face (69) of said scanner plate, facing said filtering drum, being provided with a through-slit (22) that provides a passage between said inner face (69) and said outer face (68) of said scanner plate, said slit being substantially parallel to a drum generatrix closest to said scanner plate, said outer face (68) of said scanner plate being provided, along the length of said slit (22), with a trough (21) which forms, together with the inner wall of said pressure vessel, a channel for collecting flushing liquid during the cake-removal cleaning operation, said channel communicating with an exit conduit (24) outside said pressure vessel by means of a plurality of through-holes (23) in the wall (19) of said pressure vessel.

2. SELF-CLEANING DRUM FILTER as claimed in claim 1, characterized by the fact that the outside of the cylindrical wall of the filtering drum (15) consists of a multitude of channels (55) bounded by ridges (56) parallel to the drum's generatrices, the edges of said ridges providing support to the filtering mat (57), said filtering drum wall being provided with a plurality of through-holes (64).

3. SELF-CLEANING DRUM FILTER as claimed in claim 1, characterized by the fact that said linkage means comprise a shaft (27) having its upper end connected to a speed reducer and provided in its lower end with a crossbar (51) which slidingly engages two posts (49) symmetrically placed on a flat bar (47) bolted to a disk (40) attached to the upper extremity of the filtering drum (15).

4. SELF-CLEANING DRUM FILTER as claimed in claim 1, characterized by the fact that said sealing means between the outside and comprise a first cup of nylon or UHMW plastic (28) with associated sealing elements and a second cup of stainless steel (37) whose upper portion slidingly fits inside said first cup and associated sealing elements and whose lower portion forms a skirt (38).

5. SELF-CLEANING DRUM FILTER as claimed in claim 4, characterized by the fact that the sealing elements associated with said first cup (28) comprise an O-ring sealing gasket (35) that fits between the top of said cup and the inner face of said pressure vessel's lid (12), and a sealing ring (33) provided with a lip that slidingly contacts said shaft (27), and a sealing ring (36) that slidingly contacts the outer surface of said second cup (37).

6. SELF-CLEANING DRUM FILTER as claimed in claim 4, characterized by the fact that the sealing elements associated with said second cup (37) comprise an upper (42) and a lower (44) flat plastic rings slidingly juxtaposed on the upper and lower surfaces of said skirt (38) said upper flat ring being pressed against the lower surface of a profiled ring (43) that fits the border of a central opening of said disk (40), and said lower ring (44) slidingly fitting into a groove that encircles the central opening of said disk (40).

7. SELF-CLEANING DRUM FILTER as claimed in claim 1, characterized by the fact that the removal of the cake collected in the outside of the filtering mat (57) is provided by the combined action of a first backflow liquid stream flowing from the inside to the outside of the filtering mat into said slit (22) provided in the scanner plate (18) and two converging liquid streams tangentially flowing from the edges of said scanner toward said slit.

8. SELF-CLEANING DRUM FILTER as claimed in claim 1, characterized by the fact that said scanner plate is provided with two grooves (72, 73) extending on both sides of said central slit (22) into which fit shanks of two brushes (74) extending alongside the edges of said scanner plate and having their bristles substantially perpendicular to said scanner's inner face.

9. SELF-CLEANING DRUM FILTER as claimed in claim 1, characterized by the fact that the pressure head in an annulus between the pressure vessel inner wall and the outside of the filtering drum is higher than the head inside said filtering drum, the latter being higher than the pressure in the channel that collects the flushing liquid formed by said trough (21) and the inner wall of the pressure vessel.

10. SELF-CLEANING DRUM FILTER as claimed in claim 1, characterized by the fact that the filtering mat (57) is covered by a protecting screen (81) made of chemically inert and mechanically resistant material.

* * * * *